US005529445A

United States Patent [19]

Obermeier et al.

[11] Patent Number: 5,529,445

[45] Date of Patent: Jun. 25, 1996

[54] TOOL BIT AND TOOL CHUCK FOR MANUALLY OPERATED TOOLS

[75] Inventors: Josef Obermeier, Peiting; Axel Neukirchen, Munich, both of Germany

[73] Assignee: Hilti Aktiengesellschaft, Schann, Liechtenstein

[21] Appl. No.: 382,726

[22] Filed: Feb. 2, 1995

[30] Foreign Application Priority Data

Feb. 2, 1994 [DE] Germany .......................... 44 03 303.6

[51] Int. Cl.[6] .......................... B23B 51/00

[52] U.S. Cl. .......................... 408/226; 279/19; 408/240

[58] Field of Search .......................... 408/226, 239R, 408/239 A, 240; 279/19, 19.2, 19.3, 19.4, 19.5, 19.6, 75

[56] References Cited

U.S. PATENT DOCUMENTS

| | | | |
|---|---|---|---|
| 4,107,949 | 8/1978 | Wanner et al. | 408/226 |
| 5,286,145 | 2/1994 | Kleine | 408/239 R |
| 5,320,459 | 6/1994 | Kleine | 408/226 |
| 5,346,340 | 9/1994 | Runge | 408/226 |

FOREIGN PATENT DOCUMENTS

| | | | |
|---|---|---|---|
| 3941646 | 6/1991 | Germany | 408/226 |

*Primary Examiner*—Daniel W. Howell
*Attorney, Agent, or Firm*—Anderson Kill Olick & Oshinsky

[57] ABSTRACT

A tool bit for insertion into a tool bit chuck on a manually operated tool used for cutting and/or percussion drilling includes an axially extending chucking shank (1). The chucking shank has two axially extending rotary entrainment grooves (2, 3) open at a free end of the shank and located diametrically opposite one another. The transverse cross-sectional areas of the rotary entrainment grooves (2, 3) are different. A locking element displaceable into a locking groove (4) with axially displaced closed ends affords axial securement of the chucking shank in the chuck. To increase the torque to be transmitted, an axially extending groove (5) open at the free end of the shank is provided with its cross-section transverse of the axial direction corresponding at least to the transverse cross-section of the locking groove (4). Due to this arrangement, faulty locking of the chucking shank in the chuck of conventional commercially available manually-operated tools can be easily recognized by the tool operator.

6 Claims, 2 Drawing Sheets

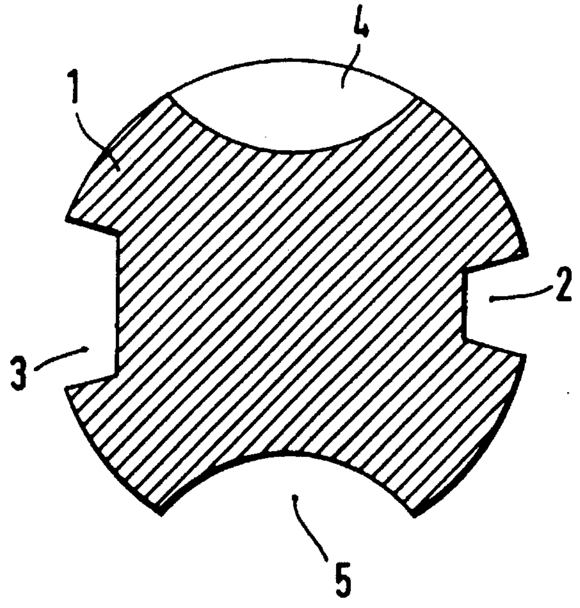
Fig. 1
Fig. 2
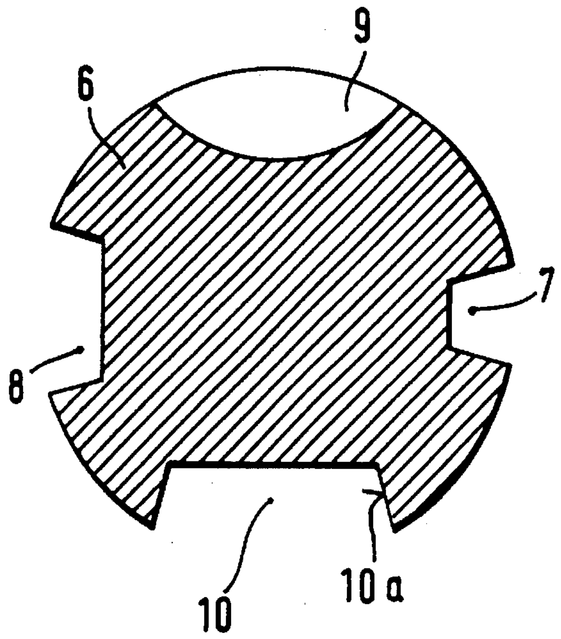

TOOL BIT AND TOOL CHUCK FOR MANUALLY OPERATED TOOLS

BACKGROUND OF THE INVENTION

The present invention is directed to a tool for insertion into a tool bit chuck of a manually operated tool used for cutting and/or percussion drilling and includes an axially extending chucking shank with a free end and at least one locking groove closed at its end spaced apart in the axial direction, at least one axially extending groove open at the free end of the chucking shank and located substantially diametrically opposite the locking groove. In addition the clamping shank has two rotary entrainment grooves open at the free end of the chucking shank and positioned substantially diametrically opposite one another and each has a transverse cross-sectional area and an opening extending circumferentially in the outside surface of the shank of a different size with respect to the other.

At the present time, tool bits as disclosed in DE-PS 25 51 125 are in widespread use worldwide and include chucking shanks having two locking grooves closed at their ends spaced apart in the axial direction and located diametrically opposite one another along with two rotary entrainment grooves open at the free end of the chucking shank and also located diametrically opposite one another. The locking grooves have the same cross-sectional dimensions as do the rotary entrainment grooves.

The above-mentioned tool bits are used in manually operated tools with tool bit chucks containing two axially extending entrainment strips as well as two radially displaceable locking elements. The entrainment strips are intended to seat within the rotary entrainment grooves for transmitting torque. The radially displaceable locking elements, in the form of balls or rollers, cooperate with the closed-ended locking grooves and serve for securing the tool bit in the axial direction within the tool bit chuck.

Since particularly high strength requirements are not needed for the axial retention of the tool bits in the tool bit chucks, the use of a single locking element has come into increased use instead of two locking elements. In such axial securement it is attempted to ensure that the tool bit does not become disengaged accidentally from the tool bit chuck, so that in particular on building sites there is no danger of the tool bit dropping out of the tool bit chuck. In addition, the axial securement serves to retain the tool bit within the chuck of the manually operated tool when the tool bit is removed from a structural part after its working operation is complete.

Considerably higher strength requirements are needed for transmitting torque. Particularly, due to the larger working diameter of the tool bit coming into increased use along with the increase in output of the manually operated tool, increasingly higher torques must be transmitted. Such characteristics result in premature wear occurring in the chucking shank of the tool bit, especially in the region of the rotary entrainment grooves and such wear takes place considerably in advance of the normal wear of the remaining parts of the tool bit.

To eliminate these problems, especially regarding higher torques to be transmitted, it has been proposed in DE-A-39 41 646 to provide one of the rotary entrainment grooves with a larger cross-sectional area. This feature enables the enlargement of the cooperating entrainment groove in the tool bit chuck so that a reserve is afforded for higher wear.

In addition to the increased cross-sectional area, it has been. proposed in DE-A-39 41 646 to provide an axially extending groove open at the free end of the chucking shank. The axially extending groove permits the use of a corresponding axially extending strip in the tool bit chuck cooperating with the axially extending groove, so that an additional flank is available for transmitting torque.

All of the above-mentioned features have their justification and advantages if tool bits are used in matching or corresponding tool bit chucks. As indicated above it must be taken into consideration, because of the tool bits previously in use, that manually operated tools have been in general use worldwide in which the chucks have two entrainment strips of the same cross-section and one or two radially displaceable locking elements. Accordingly, it is important to design tool bits formed for transmitting higher torques so that they are compatible with the tool bit chucks in manually operated tools commercially available at the present time, even while neglecting the advantages achieved with the new tool bits.

A serious disadvantage of the previously mentioned tool bit with only one axially extending groove in the chucking shank is that it cannot be used in manually operated tools in which the tool bit chuck has two locking elements, since the second locking element cannot enter into the axially extending groove. If the tool bit is used in a tool bit chuck with only one locking element there is the possibility with entrainment strips of the same cross-section of introducing the tool bit turned through 180°. Because of the existing clearances for the flexural support of the locking element it is possible that radial displacements can be effected, so that the locking element enters into a partially quite strong frictional lock with the chucking shank. An operator cannot readily recognize such faulty locking, since the frictional lock resists the routine checking operation used for determining the proper axial securement. The accidental disconnection of the axial securement of the tool bit in the tool bit chuck takes place unexpectedly and in an undesired manner in use, so that the possibility of accidents cannot be excluded.

SUMMARY OF THE INVENTION

Therefore, the primary object of the present invention is to provide a tool bit suitable for transmitting large torques in appropriately shaped tool bit chucks and which also can be used in conventional tool bit chucks with the ability to readily recognize if faulty locking takes place.

In accordance with present invention, the transverse cross-sectional area of the axially extending groove corresponds at least to the transverse cross-sectional area of the locking groove.

The chucking shank and the tool bit embodying the present invention can be inserted without any difficulty into conventional tool bit chucks having two locking elements. If the inventive tool bit is properly introduced into a conventional tool bit chuck with only one locking element an adequate axial securement is achieved. If, on the other hand, the tool bit is introduced into such a tool bit chuck turned erroneously through 180°, the locking element enters completely into the transverse cross-sectional area of the axial extending groove, however, it does not establish contact with any circumferential part of the chucking shank. Accordingly, no connection between the chucking shank and the locking element is attained, whereby the operator recognizes that the tool bit has been wrongly inserted into the tool bit chuck, since no axial securement is obtained and determined by the manual checking of the tool bit which is done in the usual case. As a result, it is completely assured that the operator commences operation with a properly inserted tool bit.

In a preferred embodiment, the transverse cross-sectional area of the axially extending groove corresponds to the transverse cross-sectional area of the locking groove. It is preferred to arrange the axially extending groove symmetrically to the locking groove with respect to the axes of symmetry of the rotary entrainment grooves.

In view of the rotationally symmetrical locking members, such as balls, cylinders or rollers, as presently in use, advantageously the axially extending groove has an arcuately shaped base. By an arcuately shaped base of the axially extending groove is meant that the base viewed in transverse cross-section is matched to the outside surface of the rotationally symmetrically locking members presently in use.

According to another embodiment of the invention, the transverse cross-sectional view of the axially extending grooves can exceed in area or size the transverse cross-section of the locking grooves. As a result, different shapes of the axially extending groove are available, particularly with regard to cooperation with appropriately configured axially extending strips of new tool bit chucks.

Preferably, the axially extending groove has at least one flank extending substantially radially. Because of the torque to be transmitted, it is appropriate if the entrainment side flank of the axially extending groove extends substantially radially. The other flank can be arranged differently, for instance chord-like, or it may also extend radially.

As has been pointed out, it is intended primarily that the inventive tool bit can be used in manually operated tools widely available on the market. Another consideration, however, is that the tool bit can be used so that it can transmit larger torque. This second feature is achieved by the use of an appropriately designed tool bit chuck having at least one radially displaceable locking element cooperating with the locking groove closed at its axially spaced ends, two entrainment strips cooperating with the rotary entrainment grooves and having different transverse cross-sectional areas and different widths at the outside surface of the chucking shank, along with one axially extending strip cooperating with the axially extending groove.

With the wider configuration of one of the entrainment strips, the chucking shank is capable of withstanding greater wear. Furthermore, an additional flank for torque transmittal is afforded by the axially extending strip.

While a specific embodiment of the invention has been shown and described in detail to illustrate the inventive principles, it will be understood that the invention may be embodied otherwise without departing from said principles.

BRIEF DESCRIPTION OF THE DRAWING

In the drawing:

FIG. 1 is a transverse cross-sectional view through a chucking shank of a tool bit embodying the present invention;

FIG. 2 is a transverse cross-sectional view through a chucking shank of another tool bit embodying the present invention.

DETAILED DESCRIPTION OF THE INVENTION

Figure 3:
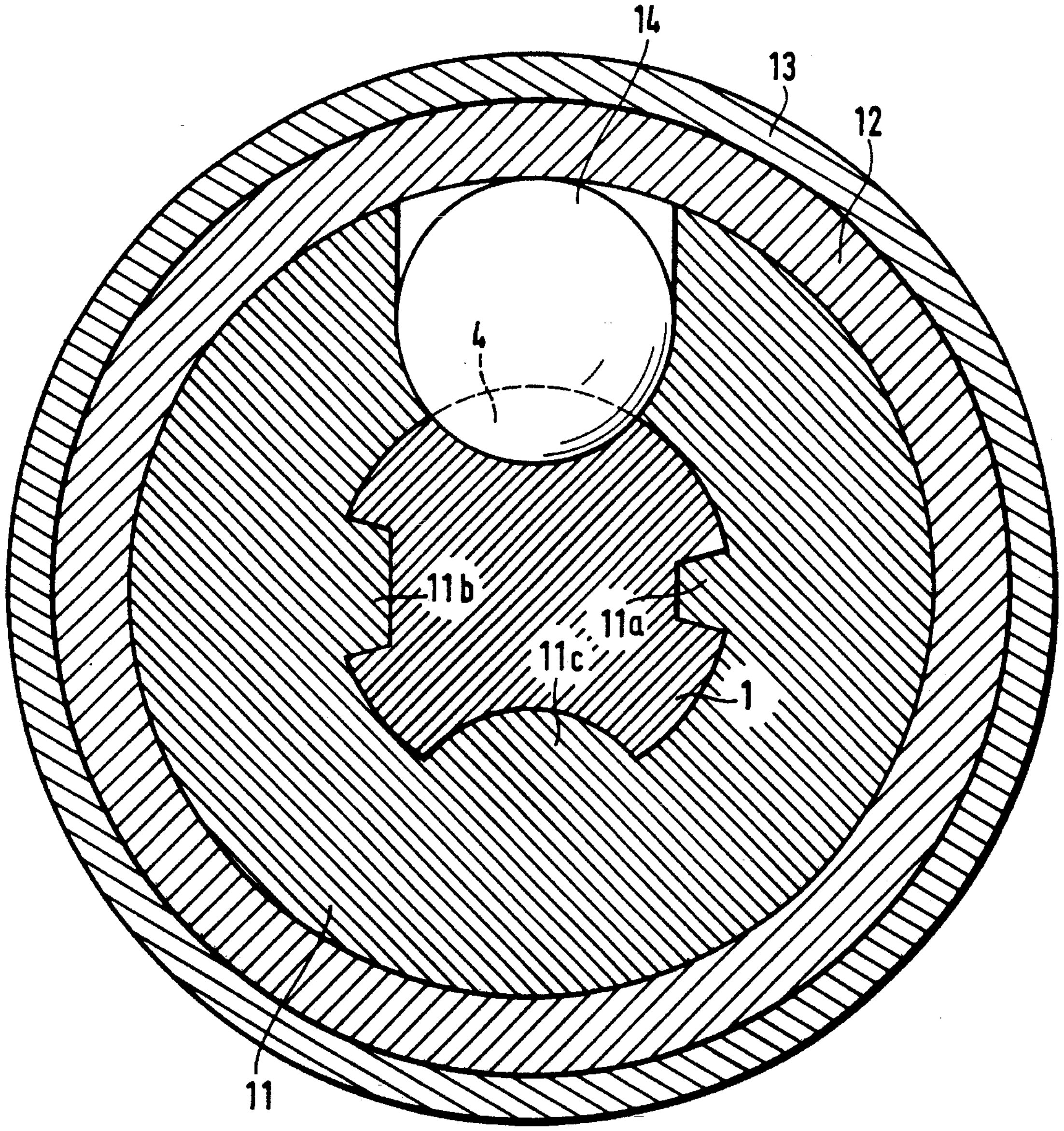
FIG. 3 is a transverse cross-sectional view through a tool bit chuck with an inserted tool bit having a chucking shank corresponding to FIG. 1 and illustrated in a simplified manner.

In FIG. 1 a transverse cross-sectional view is provided of an axially extending chucking shank 1. Chucking shank 1 has a free end that is inserted first into a tool chuck. The chucking shank 1 has an outside surface extending circumferentially and axially with two axially extending rotary entrainment grooves 2, 3 located diametrically opposite one another in the outside surface with the rotary entrainment groove 3 having a larger cross-sectional area and a larger opening in the outside surface, that is, the opening extending in the circumferential direction. In addition, on one side of the chucking shank 1 between the rotary entrainment grooves 2 and 3 there is a locking groove 4 with closed ends spaced apart in the axial direction. Locking groove 4 is located diametrically opposite to an axially extending groove 5 having an arcuate, concave shaped surface base. The axially extending groove 5 is open at the free end of the clamping shank 1.

In FIG. 2 another tool bit embodying the present invention is illustrated in transverse cross-section. The chucking shank has a free end, that is the end inserted first into a tool chuck. As in FIG. 1, the clamping shank 6 has two axially extending rotary entrainment grooves 7, 8 located diametrically opposite one another. The chucking shank 6 has an axially and circumferentially extending outside surface. The rotary entrainment groove 8 has a larger transverse cross-sectional area with a larger opening in the circumferential direction in the outside surface of the shank. Located in the outside surface between the rotary entrainment grooves 7, 8 is a locking groove 9 with closed ends spaced apart in the axial direction. An axially extending groove 10 is located diametrically opposite the locking groove 9. The transverse cross-sectional area of the axial extending groove 10 which has a planar base is greater than the transverse cross-sectional area of the locking groove 9. Furthermore, at least the entrainment side flank 10*a* of the axially extending groove 10 extends substantially radially for affording optimum torque transmittal. In this embodiment the axially extending groove 10 of the chucking shank 6 has radially extending flanks on both sides.

FIG. 3 is a transverse cross-section through an axially extending tool bit chuck illustrated in a simplified manner with a tool bit having a chucking shank corresponding to that in FIG. 1 inserted into the chuck. The tool bit chuck comprises an annular guide 11 laterally encircled by an actuation sleeve 12 and, in turn, a cage 13 laterally encloses the sleeve 12. Guide 11 has two axially extending entrainment strips 11*a*, 11*b* positioned diametrically opposite to one another. The entrainment strip 11*b* has a larger transverse cross-sectional area with a greater width as compared to the entrainment strip 11*a*. In addition, guide 11 has an axially extending entrainment strip 11*c* which has an arcuate shape with a convex surface viewed in transverse section seated in the concave surface axially extending groove 5. A radially displaceable locking element 14 in the shape of a ball is positioned in the guide 11 for axially securing the tool bit in the chuck.

While a specific embodiment of the invention has been shown and described in detail to illustrate the inventive principles, it will be understood that the invention may be embodied otherwise without departing from said principles.

We claim:

1. Tool bit for insertion into a tool bit chuck on a manually operated tool used for cutting and/or percussion drilling and comprising an axially extending chucking shank having a free end and an axially and circumferentially extending outside surface, said chucking shank has at least one locking groove (4, 9) in said outside surface with closed ends spaced apart in the axial direction, at least one axially extending groove (5, 10) is formed in said outside surface open at the free end and located substantially opposite said locking groove (4, 9) and two axially extending rotary entrainment grooves (2, 3, 7, 8) located in said outside surface open at the free end and positioned substantially diametrically opposite one another, said rotary entrainment grooves (2, 3, 7, 8) have different cross-sectional areas transverse of the axial direction and openings in the outside surface of different dimensions in the circumferential direction, wherein the improvement comprises that the cross-sectional area of said axially extending groove disposed transversely of the axial direction corresponds at least to the cross-sectional area of said locking groove extending transversely of the axial direction, of the transverse cross-sectional area of the axially extending groove (5) corresponds to the transverse cross-sectional area of said locking groove (4).

2. Tool bit, as set forth in claim 1, wherein the axially extending groove (5) is axially symmetrical to said locking groove (4) relative to the axes of symmetry of the rotary entrainment grooves (2, 3).

3. Tool bit, as set forth in claim 2, wherein said locking groove has a concave-shaped arcuate base and said axially extending groove has a corresponding concave-shaped arcuate base.

4. Tool bit, as set forth in claim 1, wherein said axially extending groove (10) has at least one flank extending substantially radially.

5. Tool bit, as set forth in claim 6, wherein said axially extending groove (10) has an entrainment side flank (10*a*) extending substantially radially.

6. Tool bit chuck with an axially extending opening for receiving a tool bit, as set forth in claims 1, 2, 3, 4, or 5, wherein said chuck comprises at least one radially displaceable locking element (14) cooperating with said locking groove with the axially closed end, two axially extending entrainment strips (11*a*, 11*b*) cooperating with the rotary entrainment grooves and having different transverse cross-sectional areas and different circumferential widths, and at least one axially extending strip (11*c*) cooperating with said axially extending groove.

* * * * *